(12) United States Patent
Olkin

(10) Patent No.: US 6,310,892 B1
(45) Date of Patent: Oct. 30, 2001

(54) RELIABLE CONNECTIONLESS NETWORK PROTOCOL

(75) Inventor: Jeffrey C. Olkin, Sunnyvale, CA (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 09/005,526

(22) Filed: Jan. 9, 1998

Related U.S. Application Data (63) Continuation of application No. 08/767,517, filed on Dec. 16, 1996, now abandoned, which is a continuation of application No. 08/343,761, filed on Nov. 21, 1994, now abandoned.

(51) Int. Cl.$^7$ ........................................... H04J 3/24
(52) U.S. Cl. ......................................... 370/473; 370/474
(58) Field of Search ............................... 370/473, 474, 370/401, 469, 471, 235, 338, 349, 252, 392, 389; 455/445, 456, 500, 422, 446

(56) References Cited

U.S. PATENT DOCUMENTS

| | | | |
|---|---|---|---|
| 4,493,021 | 1/1985 | Agrawal et al. | 364/200 |
| 4,954,965 | 9/1990 | Johnson et al. | 364/514 |
| 4,975,952 | 12/1990 | Mabey et al. | 380/49 |
| 5,050,166 | * 9/1991 | Cantoni et al. | 370/94.1 |
| 5,151,899 | 9/1992 | Thomas et al. | 370/94.1 |
| 5,220,562 | 6/1993 | Takada et al. | 370/85.13 |
| 5,235,595 | 8/1993 | O'Dowd | 370/94.1 |
| 5,251,207 | * 10/1993 | Abensour et al. | 370/60.1 |
| 5,260,933 | 11/1993 | Rouse | 370/14 |
| 5,377,192 | * 12/1994 | Goodings et al. | 370/95.3 |
| 5,379,296 | * 1/1995 | Johnson et al. | 370/60 |
| 5,386,412 | 1/1995 | Park et al. | 370/53 |
| 5,444,709 | 8/1995 | Riddle | 370/94.1 |
| 5,491,800 | 2/1996 | Goldsmith et al. | 395/200.12 |
| 5,572,678 | 11/1996 | Homma et al. | 395/200.12 |
| 5,852,721 | * 12/1998 | Dillon et al. | 395/200.47 |

FOREIGN PATENT DOCUMENTS 8807293  3/1988  (WO).

OTHER PUBLICATIONS

"There Are Many Routes To Packet Switching", Amy Gorin, PC Week, v4, n44, pc16(1), 2 pp., Nov. 3, 1987.
"Electronic Ties That Bind" (Local Area Networks), T. J. Byers, Computers & Electronics, v22, p. 68 (8), Mar. 1984.
"When One LAN Is Not Enough: Bridges, Routers, And Gateways Can 'Network The Networks'", William Stallings, BYTE, Dec. 1988; p. 293 (7),vol. 13, No. 13.
"Getting Protocols Right", Morgan Guy, Tech PC User, v1, n8, p. 16 (14), Apr. 1989.

* cited by examiner

*Primary Examiner*—Mark Zimmerman
*Assistant Examiner*—Enrique L Santiago
(74) *Attorney, Agent, or Firm*—Hickman Palermo Truong & Becker; Craig G. Holmes (57) ABSTRACT

A reliable connectionless protocol is used in a networking environment. A transport layer receives data for transfer between a source node and a destination node on a network. The transport layer divides the data into predetermined length data packets, and generates a segment header for each data packet. The transport layer generates independent segments by combining each data packet with a corresponding segment header. Consequently, each segment, including the first segment and the last segment, contains a data packet. The independent segments are transferred from the source node to the destination node via the network without establishing a connection. A transport layer on the destination node creates local state upon receipt of the first segment, and extracts the data from the data packets to re-construct the original data. The local state is released when the destination node receives the last segment in the message.

38 Claims, 6 Drawing Sheets

RELIABLE CONNECTIONLESS NETWORK PROTOCOL

This application is a continuation of Ser. No. 08/767,517 filed Dec. 16, 1996 ABN, which is a continuation of Ser. No. 08/343,761, filed Nov. 21, 1999 ABN.

FIELD OF THE INVENTION

The present invention relates to the field of protocols for a network environment, and more specifically to a reliable connectionless protocol.

BACKGROUND OF THE INVENTION

Figure 1A:
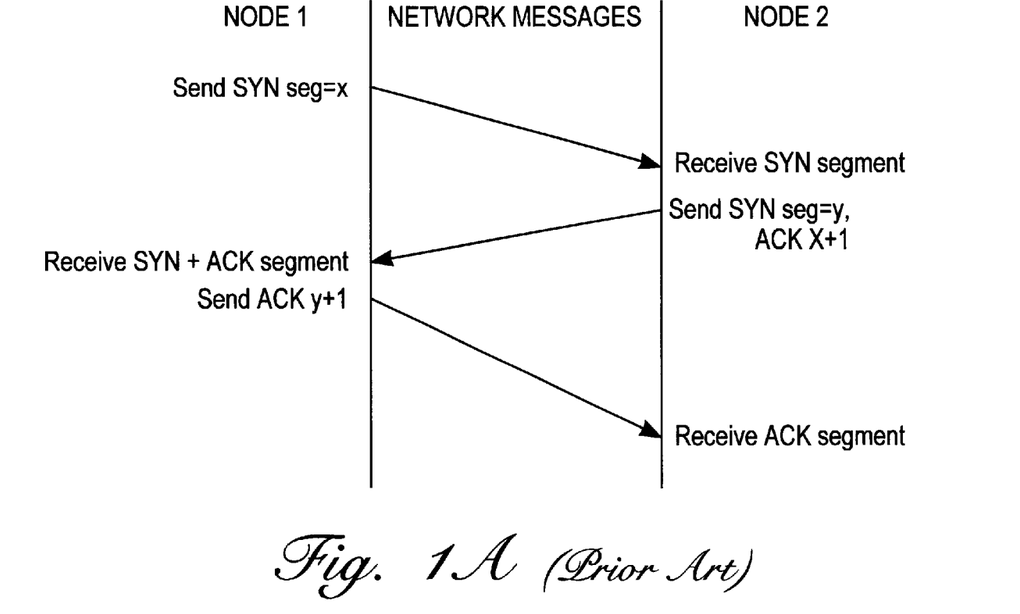
FIG. 1a illustrates a prior art protocol for opening a connection in the transmission control protocol/internet protocol (TCP/IP) network environment.

FIG. 1a illustrates a prior art protocol for opening a connection in the transmission control protocol/internet protocol (TCP/IP) network environment. The open connection protocol consists of a three way handshake. For the example illustrated in FIG. 1a, the open connection is between "node 1" and "node 2". In order to initiate the open connection, node 1 sends a segment having the SYN bits set in the code field. The node 2, in a second segment, sets both the SYN bit and ACK bits. This response by node 2 both acknowledges the first SYN segment as well as continues the handshake protocol with node 1. However, the second segment does not complete the protocol, but the second segment is a mere acknowledgment that is used to inform node 1, the initiator, that both sides agree that a connection has been established. In a third segment, the node 1 initiator sends an ACK segment back to node 2. After the connection has been established, data transfer may commence.

Figure 1B:
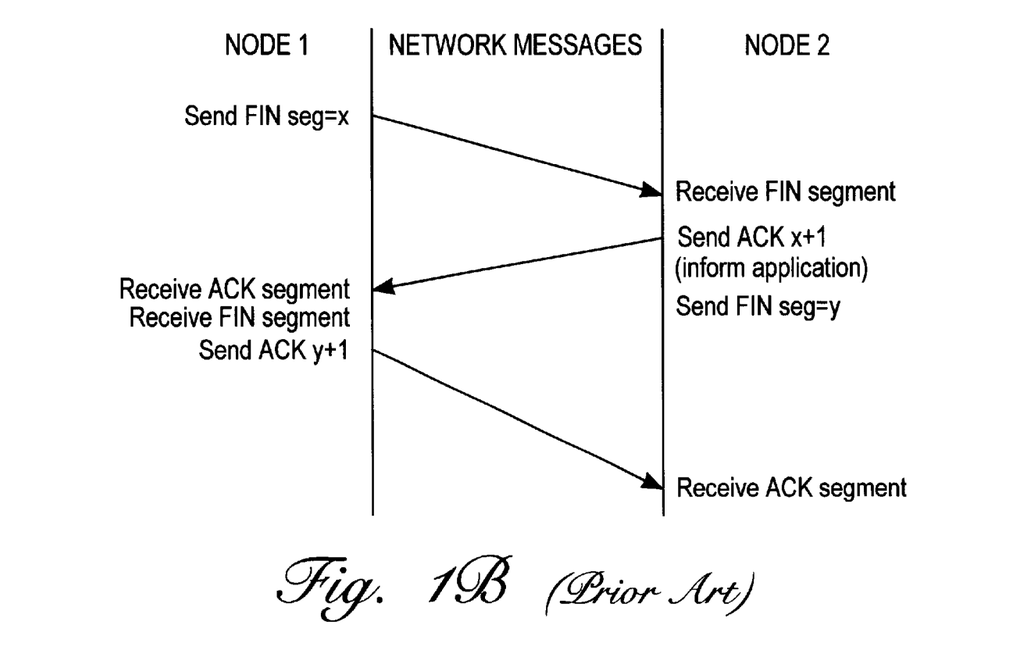
FIG. 1b illustrates the prior art protocol for closing a connection in accordance with the TCP/IP networking protocol.

FIG. 1b illustrates the prior art protocol for closing a connection in accordance with the TCP/IP networking protocol. The closed connection protocol is a modified three-way handshake. For the example illustrated in FIG. 1b, node 1 initiates closing of the connection. The response from the node after receiving the initial FIN segment for the close connection of TCP/IP protocol is different from the open connection. As shown in FIG. 1b, instead of generating a second FIN segment immediately, node 2 sends an acknowledgment. In response to the initial FIN segment, the network interface informs an application of the request to close the connection. When the application instructs the network interface to close the connection, node 2 sends the second FIN segment, and node 1 replies in a third segment using the ACK segment.

SUMMARY OF THE INVENTION

A reliable connectionless protocol is used in a networking environment. The reliable connectionless protocol utilizes a one way message protocol in order to maintain reliability without the additional overhead of opening and closing a connection. The network contains a plurality of nodes for transfer of data between a source node and at least one destination node. Each node configured for the message protocol of the present invention contains, in part, a transport layer coupled to at least one application.

In operation, the transport layer receives data for transfer between a source node and a destination node on the network. The transport layer divides the data into predetermined length data packets. The pre-determined length data packets are unrelated to the amount of data for transfer. In addition to generating the data packets, the transport layer generates a segment header for each data packet. The segment header defines an order for the corresponding data packet based on the original data received from the application. In one embodiment, the segment header defines whether the corresponding data packet is the first data packet, an interim data packet, or the last data packet.

The transport layer generates independent segments by combining each data packet with a corresponding segment header. Consequently, each segment, including the first segment and the last segment, contains a data packet. Additional control information is added to transfer the segments over the network. The independent segments are transferred from the source node to the destination node via the network such that each independent segment transfers part of the original data without establishing a connection.

A transport layer on the destination node utilizes the information in the segment header to determine a first segment for the data transfer, thereby allowing the destination node to begin to receive the data. The destination node transport layer extracts the data from the data packets to re-construct the original data. When the destination node receives the last segment, the destination node finishes the re-construction of the original data, and discards the information in the segment header used to re-construct the data.

Other features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

The present invention is a reliable connectionless protocol used in a networking environment. Specifically, the present invention utilizes a one way message phenomenon in order to maintain reliability without the additional overhead of opening and closing a connection. The three-way handshakes used by the TCP/IP protocol are designed to coordinate two ends of a connection for data transfer even if both ends initiate or close down a connection simultaneously.

In the TCP/IP networking environment, the three-way handshake is both necessary and sufficient for correct synchronization between the two ends of a connection because the TCP/IP protocol depends upon an unreliable packet delivery service. Because of the unreliable packet delivery service, messages can be lost, delayed, duplicated or delivered out of order. In order to compensate for the unreliable service, the TCP/IP protocol specifies a time-out mechanism to retransmit lost requests. However, ambiguity and uncertainty is introduced if retransmitted or original requests arrive while the connection is being established, or if retransmitted requests are delayed until a connection has been established, used, and terminated. In order to solve these problems, the TCP/IP protocol specifies the three-way handshake protocol to guarantee that additional requests for connection do not occur after a connection has been established.

Reliability is an essential characteristic of a network environment. The present invention provides for a message protocol that ensures reliable transfer of discrete messages. The discrete messages may be of arbitrary but finite length. As is explained more fully below, the message protocol of the present invention is connectionless (e.g., the two end nodes between which data is transferred need only retain state about each of the other node while data is in transit). In general, the connectionless nature of the message based protocol allows a distributed network to scale without consuming resources for each new connection. In addition, the connectionless nature makes the network system robust in the face of individual node failure because no connections are being dropped.

In one embodiment, the message protocol is a modification of the TCP/IP connection based, reliable protocol. For this embodiment, the basic modification is the elimination of the handshakes that are used to open and close a TCP/IP connection. In the present invention, the three-way handshake protocol is eliminated in favor of adding the control information on top of the data payload for each message transfer. Using this connectionless protocol, data are received in a first segment of the message, and data are received in a last segment of the message.

In a network environment, round trips get more expensive the slower the network. Therefore, handshaking consumes more resources the slower the network. By avoiding the open and close connection handshakes, the present invention avoids unnecessary and expensive network traffic. In addition, the destination node is permitted to view the data contained in a message as soon as the entire message is received at the destination node. For the TCP/IP network protocol, the destination node is required to wait for the handshake to complete before data may be viewed.

Typically, in network environments, a first channel is used to transmit data, and a second channel is used to open and close a connection. In addition, data are transmitted over a faster channel than the channel used to open and close a connection. For such a network environment, the destination node receives data before the receipt of an acknowledgment over the slower handshaking channel. In theory, data may be included with the initial transmission in the TCP/IP protocol. However, in the TCP/IP protocol, the destination node is not permitted to access the data until the handshake completes. Therefore, the destination node is required to wait for the round-trip acknowledgment over the slower data channel.

For the embodiment of the present invention that implements a modified TCP/IP protocol, the message protocol retains all other characteristics of the TCP/IP protocol, such as sliding windows, retransmission with back-off, and recovery from network errors. For example, network errors may include corruption, lost data, duplicated data, or data delivered out of sequence. Moreover, the message protocol of the present invention guarantees that separate discrete messages transmitted between a source node and a destination node arrive in the original order transmitted. Although a desirable attribute, preserving the ordering of discrete messages is not necessarily guaranteed by a connectionless protocol.

In general, when transmitting data between a source node and a destination node in accordance with the present invention, an application supplies data and a destination address. Prior to transmitting the data, the transport layer apportions the data into packets suitable for transport across network links. The size of the packets is determined based on the characteristics of the network, and is completely unrelated to the amount of data for transmission. Once packetization is complete, the source node transmits the packets over the network. The packets contain sufficient control information to allow independent processing and subsequent forwarding at intermediate hops for final delivery to the destination node. When packets arrive at the ultimate destination node, packets are reassembled into the original data. Consequently, only the source node and the destination node are required to maintain information about the data during transit.

Figure 2:
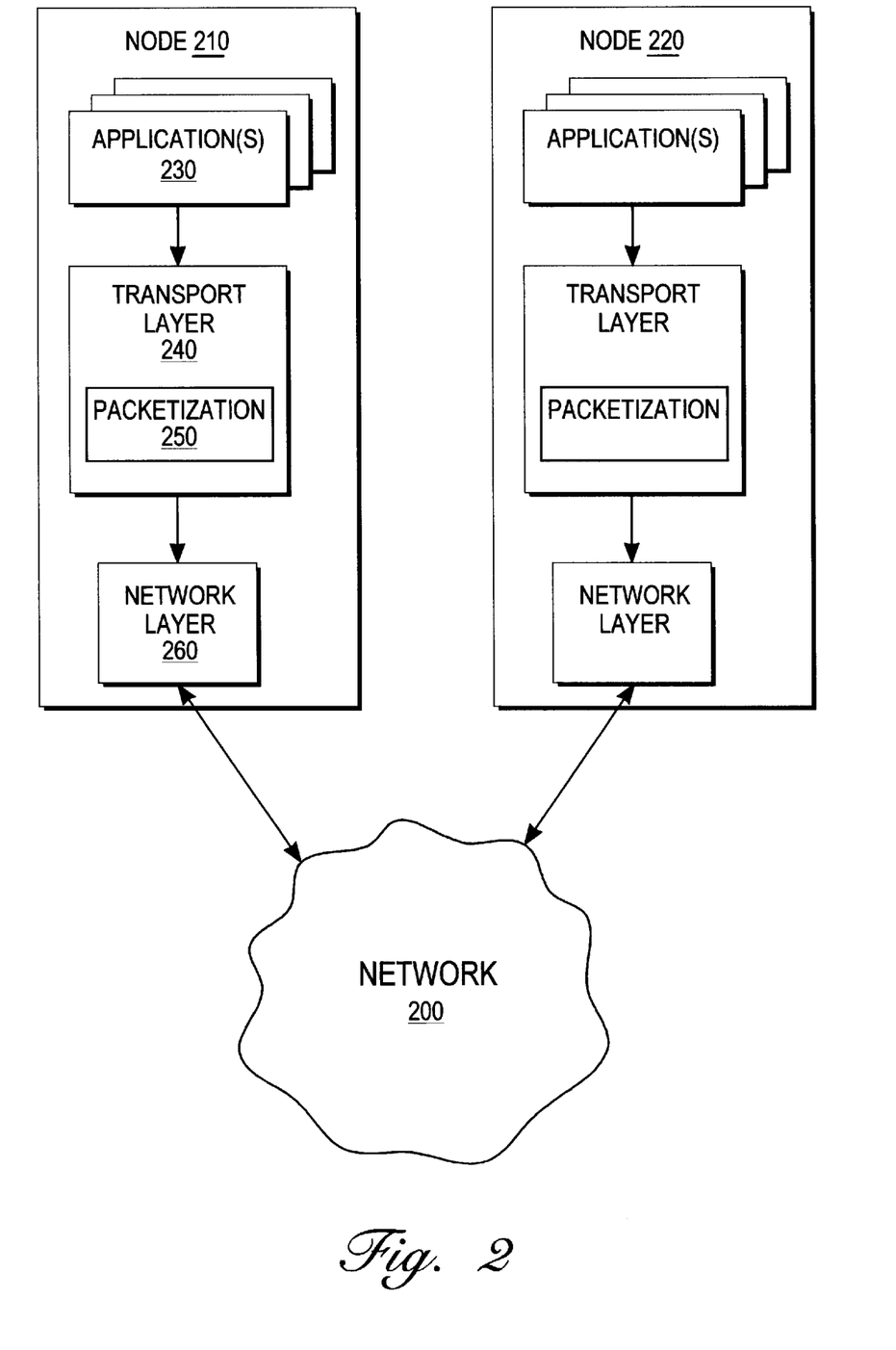
FIG. 2 illustrates a plurality of nodes coupled to a network configured in accordance with one embodiment of the present invention.

FIG. 2 illustrates a plurality of nodes coupled to a network configured in accordance with one embodiment of the present invention. As shown in FIG. 2, a node 210 and node 220 are coupled to a network 200. For purposes of explanation and clarity, FIG. 2 illustrates two nodes on the network 200, however, any number of nodes may be configured in accordance with the teachings of the present invention. The network 200 may be configured to operate as any type of network. The nodes 210 and 220 may be part of a computer system, such as a server, used to interface the computer system to the network 200.

The nodes 210 and 220 shown in FIG. 2 include the functional units required to implement the present invention. A description of the node 210 is provided. However, each node on the network configured to operate in accordance with the present invention contains similar functional units. Specifically, the node 210 includes applications 230, transport layer 240 and network layer 260. In a preferred embodiment, the applications 230 and the transport layer 240 are implemented in software on a computer platform. In general, the applications 230 perform any type of function that requires network access.

The network layer 260 is configured to interface nodes 210 and 220 to the network 200. For purposes of explanation, the network layer 260 includes the physical layer to provide a physical link to interface the node 210 to the network 200. For example, the network layer 260 may be a network interface card used to interface a computer system to a network. In a preferred embodiment, the network layer, including the physical link, is implemented with a combination of software and hardware. The specific operation of the network layer 260 is dependent upon the particular network. The network layer 260 is intended to represent a broad category of such implementations used to interface computer systems to networks, which are well known in the art and which will not be described further.

As shown in FIG. 2, the transport layer 240 contains a packetization unit 250. The transport layer 240 implements the message based protocol of the present invention. As is explained more fully below, the packetization unit 250 generates separate segments to support the connectionless protocol. In one embodiment, the transport layer 240 and network layer 260 are configured to operate in accordance with a modified TCP/IP network protocol (e.g. a connectionless TCP/IP protocol).

Figure 3:
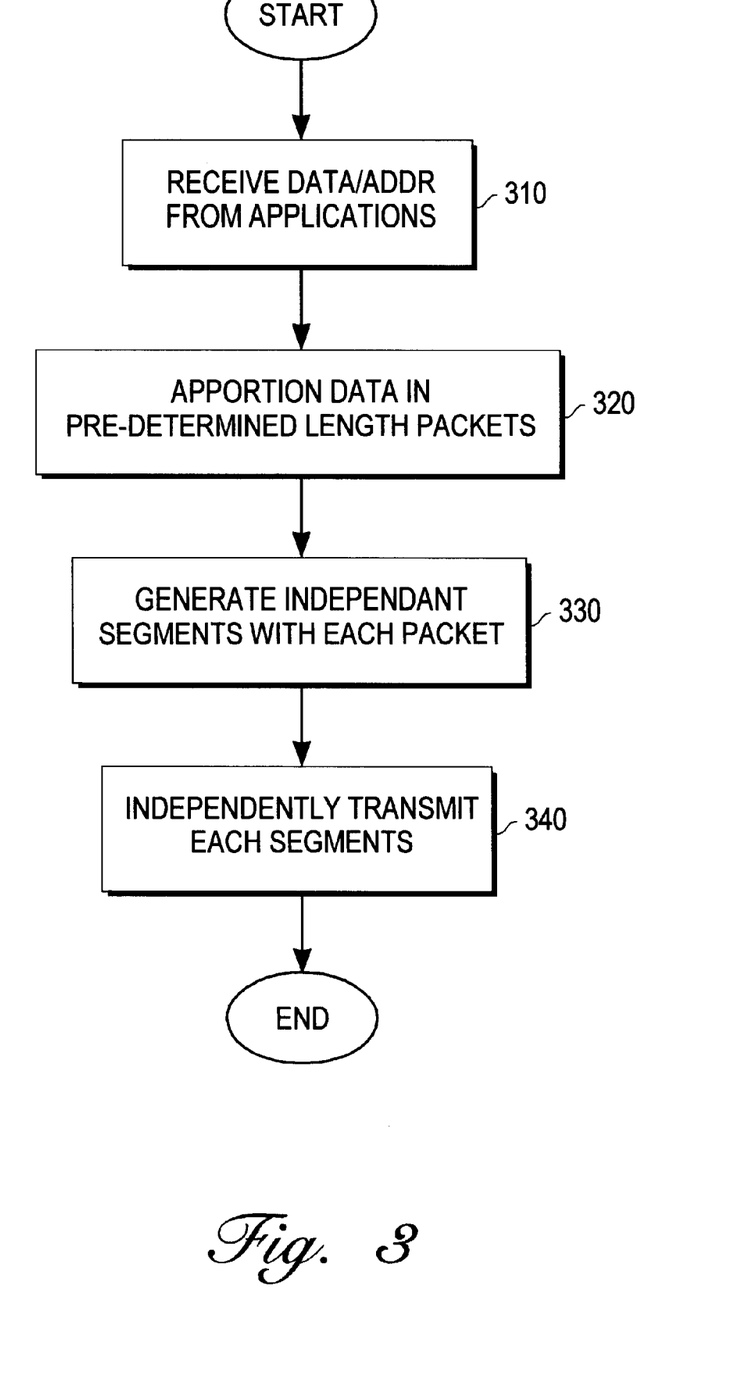
FIG. 3 is a flow diagram illustrating a high level message protocol of the present invention.

FIG. 3 is a flow diagram illustrating a high level message protocol of the present invention. As shown in block 310, the transport layer 240 receives data and addressing information from an application within the applications 230 (FIG. 2). The data received by the transport layer 240 may be of any length. In response to receiving the data, the transport layer 240 apportions data in predetermined length packets as shown in block 320. The data packets are generated in the packetization unit 250. The length of the data packets are dependent upon the particular attributes of the network 200. However, any length data packets may be used without deviating from the spirit and scope of the invention.

As shown in block 330, the transport layer 240 generates independent segments for each data packet. In addition to the data packet, the transport layer 240 adds control information received from the applications 230. The transport layer 240 forwards the independent segments to the network layer 260 such that the segments are independently transmitted over the network 200 as shown in block 340.

Figure 4:
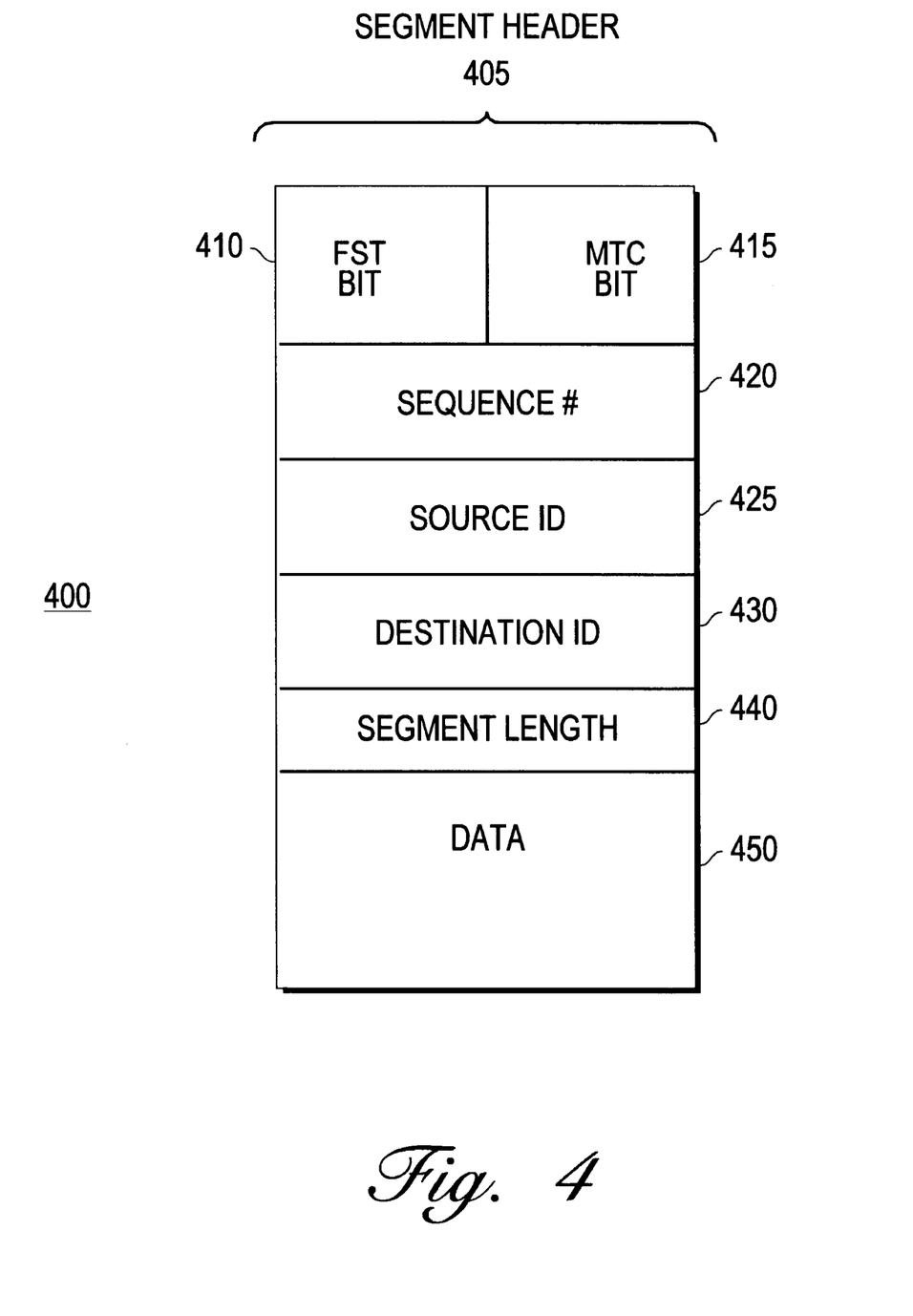
FIG. 4 illustrates a segment format configured in accordance with one embodiment of the message based protocol of the present invention.

FIG. 4 illustrates a segment format configured in accordance with one embodiment of the message based protocol of the present invention. A segment 400 contains a segment header 405. The segment header 405 further includes a first indication (FST) bit and a more to come (MTC) bit 415. Also, to specify the order for the particular segment, the segment contains a sequence number field 420. The source node for a network transaction is identified in a source identification (ID) field 425, and a destination address is identified in a destination identification (ID) field 430. Furthermore, the segment 400 includes a segment length field 440 and a data field 450. The data field contains the data packet for the particular segment, and the segment length field 440 indicates the length of the data in the data field 450.

The message format illustrated in FIG. 4 is used for each segment, including the first segment and the last segment. As is explained more fully below, the segment header 405 and the one way message protocol eliminate the need for handshaking. Furthermore, the order in which the segments are transmitted are determined by the destination node through the sequence number stored in sequence number field 420.

Figure 5:
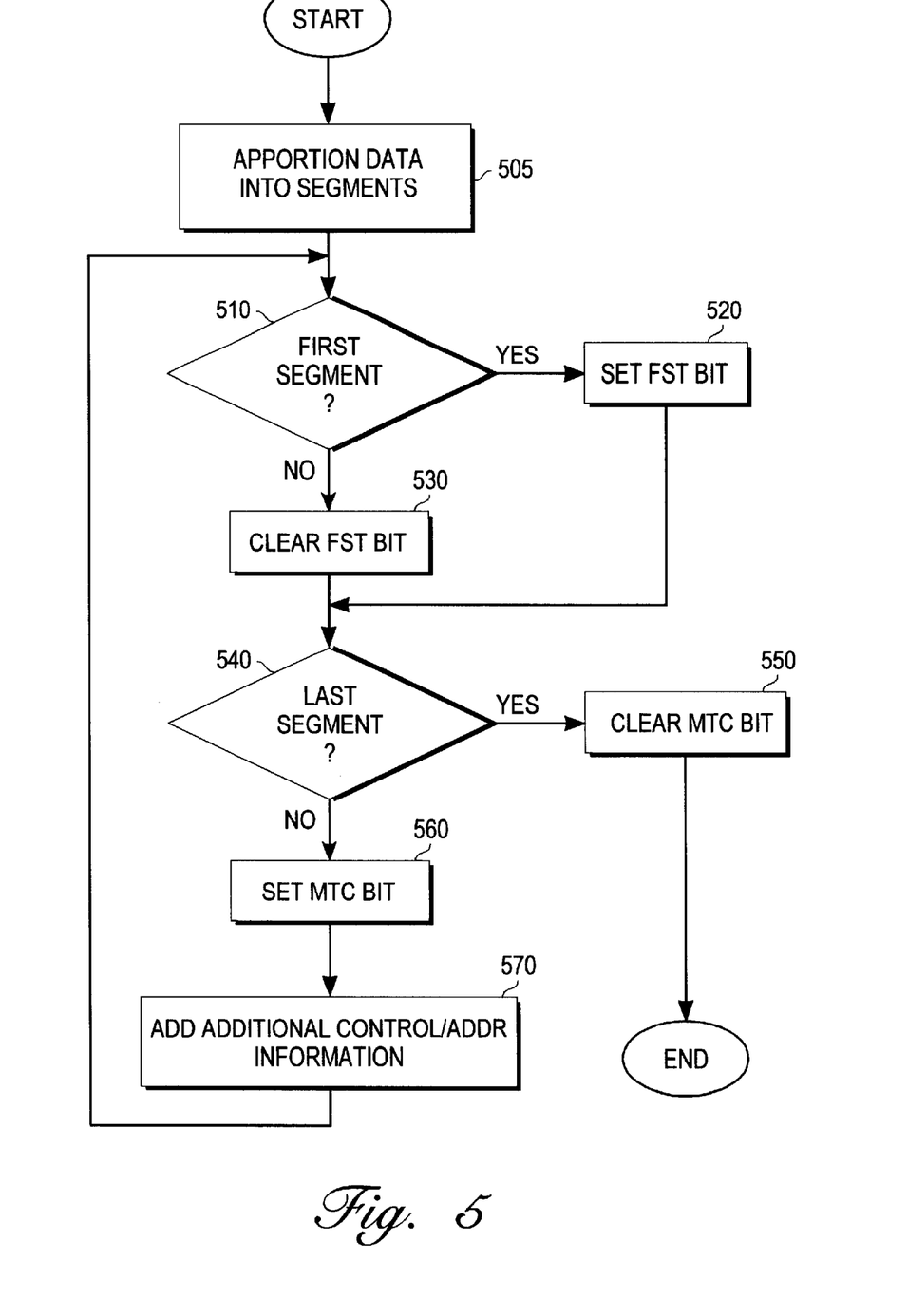
FIG. 5 is a flow diagram illustrating one method of a transport layer configured in accordance with the present invention.

FIG. 5 is a flow diagram illustrating one method of a transport layer configured in accordance with the present invention. As shown in block 505, the transport layer 240 (FIG. 2) packetizes data received from the applications 230. As shown in blocks 510 and 520, if the segment is a first segment, then the transport layer 240 sets the FST bit for that particular segment. As shown in blocks 510 and 530, if the particular segment is not the first segment, then the FST bit is cleared. The transport layer 240 determines whether the particular segment is the last segment pertaining to that data stream. If the segment is the last segment, then the MTC bit is cleared as shown in blocks 540 and 550. Alternatively, if the segment is not the last segment, then the MTC bit is set as shown in blocks 540 and 560. For each segment, the transport layer 240 sets the source ID field 425, sequence number field 420, and the destination ID field 430 (FIG. 4). The data, apportioned for the segment, is appended to the segment in the data portion 450. This process is repeated for each data packet to generate independent segments.

Figure 6:
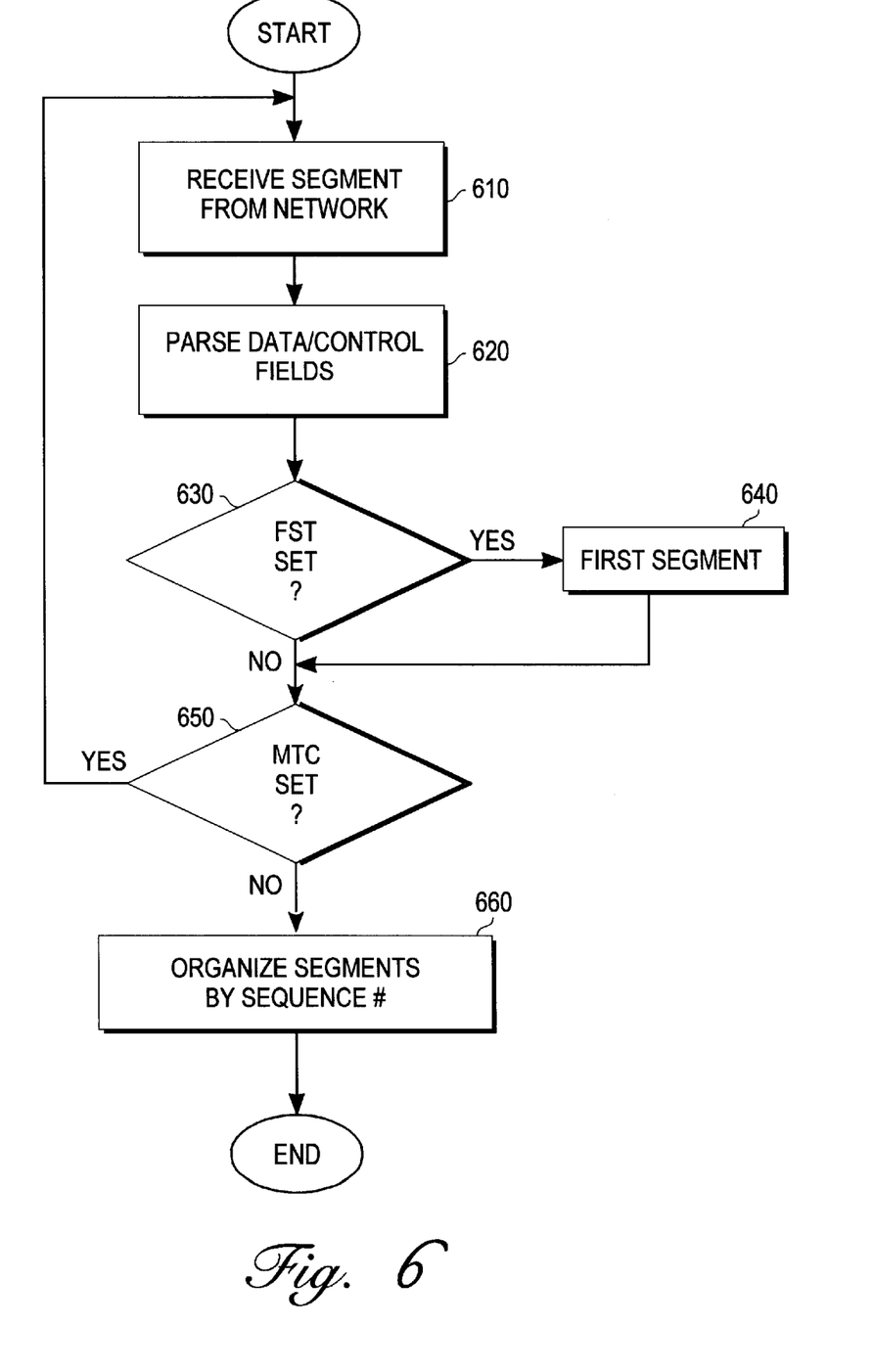
FIG. 6 illustrates the operation for one embodiment of a transport layer that receives a segment for the message based protocol of the present invention.

FIG. 6 illustrates the operation for one embodiment of a transport layer that receives a message for the message based protocol of the present invention. As shown in block 610, a segment is received from the network 120. In response, the transport layer 240 extracts data and control bits as shown in block 620. In order to implement the connectionless protocol of the present invention, the transport layer 240 determines whether the FST bit is set as shown in 630. If the FST bit is set, then the transport layer 240 knows that the segment is the first segment of the message as shown in block 640. The transport layer 240 determines whether the MTC bit is set as shown in block 650. If the MTC bit is not set, then the destination node knows that the segment is the last segment in the message. If the MTC bit is set, then the destination node knows that the segment is not the last segment for that particular data stream, then steps 610, 620, 630, 640 and 650 are repeated.

Although the connectionless protocol of the present invention does not require opening and closing a connection, the destination node initializes local state information upon receipt of the first segment of the message. The local state information allows the destination node to track subsequent segments of the message, even if segments arrive out of order, to re-construct that message. However, the local state information is discarded after has been successfully received and reconstructed. In one embodiment, the local state information is retained for a short period of time after the message is received to prevent the receipt of duplicate segments as being interpreted as part of a new message. However, the amount of time that the local state information is retained by the destination node is completely independent of the action that the source node takes following the completion of the sending of the message.

The network 200 may include a number of network links. The network links may vary widely in bandwidth and reliability. For example, the bandwidth of a network link may be sufficient to transport video or extremely limited. In general, data delivered by a network can be corrupted, duplicated, dropped, or delivered out of order. The present invention implements a message protocol to support reliable data delivery. In the message protocol, the payload or data transported is opaque in that no structure or representation of the data is understood or imposed by the protocol.

The message protocol provides for the reliable transport of discrete segments. Each individual segment contains an address to a destination node. If multiple segments within a message are sent from one source destination to the same destination node, then the segments of the message are received in the same order sent by the source node. The message protocol of the present invention is defined as an "at-most-once" protocol. That is, if the message can be delivered at all, the message is delivered exactly once. However, network link failure or unexpected termination of the destination node may cause the delivery to fail, thus preventing the message from being delivered at all.

In a preferred embodiment, reliable transport over the network is ensured by using positive acknowledgments combined with retransmission. A positive acknowledgment is an acknowledgment of data received. If an acknowledgment is not received in a certain amount of time, the source node retransmits the unacknowledged segments of the message. Generally, most transmission failures result from congestion on the network or delays at the destination node or other intermediate nodes. Any node on the network is permitted to discard a segment if that node does not have the resources to process the segment.

In order to avoid compounding the network congestion problem, the amount of time the source node waits prior to retransmission is increased between successive retransmissions. This procedure is known as exponential backoff. The exponential backoff technique allows the network time to clear and recover from the congested state. When the source node receives an acknowledgment, the source node starts to slowly transmits data. As data transmission continues, the source node gradually increases the rate of data transmission up to the full transmission rates. The exponential backoff technique avoids bouncing back and forth between congested and quiescent network conditions.

In the preferred embodiment, round-trip times taken for successful acknowledgments of transmission are observed and used to constantly adjust the retransmission timer. The adjustment of the retransmission timer permits adaptation to existing network and node conditions, thereby avoiding retransmissions based on a particular link that is consistently slower than other links.

The amount of data transmitted before requiring an acknowledgment is determined by a sliding window mechanism. With the sliding window mechanism, data are transmitted to the destination node. The source node then waits for an acknowledgment to indicate the amount of contiguous data received. As acknowledgments are received, the source node advances the window to transmit more data. The sliding window continues until all the data is transmitted and acknowledged. The size of the window is determined by the size of the buffer available to the destination node and the size is constantly adjusted. Because acknowledgments are sent by the destination node prior to receiving the last data sent in a particular window, the window advances even during transmission of data by the source node. Thus, an appropriate amount of buffer space available to the destination node ensures that the transmission of data approaches the maximum throughput of the network under normal conditions.

For example, consider a source node connected to a network via a slow 9600 bit per second (bps) upstream channel and a fast 1.5 Mbps downstream channel. An acknowledgment transmitted back to the source node takes approximately 100 to 300 ms depending on latencies in the upstream channel. During that time period, approximately 60 k bytes of data may be sent through the downstream channel before the source node stalls. Thus, if the window size is 64 k bytes, then the source node transmits as much as 64k bytes before waiting to receive an acknowledgment. Because the first acknowledgment should arrive before the source node reaches the end of the window, the source node immediately transmits more data. In practice, transfer rates will be marginally below the theoretical maximum.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for transferring data from a source node to a destination node over a network, the method comprising the computer-implemented steps of:
   dividing said data into a series of one or more segments;
   creating a plurality of packets, wherein each packet of said plurality of packets includes:
      first data that allows said destination node to determine whether all segments of said series have been received at said destination node, and
      second data that allows said destination node to order said segments to reconstruct said data that was divided into said series of one or more segments; and
   sending said plurality of packets from said source node to said destination node.

2. The method of claim 1, wherein said first data includes third data that indicates whether each packet of said plurality of packets includes a first segment of said series of one or more segments.

3. The method of claim 2, wherein said third data includes a first bit that is set by the source node to indicate that a particular packet includes said first segment of said series of one or more segments.

4. The method of claim 1, wherein said first data includes third data that indicates whether each packet of said plurality of packets includes a last segment of said series of one or more segments.

5. The method of claim 4, wherein said third data includes a second bit that is not set by the source node to indicate that a particular packet includes said last segment of said series of one or more segments.

6. The method of claim 1, wherein said first data that indicates whether each packet of said plurality of packets includes an intermediate segment of said series of one or more segments.

7. The method of claim 6, wherein said third data includes a first bit that is not set by the source node and a second bit that is set by the source node to indicate that a particular packet includes said intermediate segment of said series of one or more segments.

8. The method of claim 1, wherein said first data includes third data that indicates whether said plurality of packets consists of one packet.

9. The method of claim 8, wherein said third data includes a first bit that is set by the source node and a second bit that is not set by the source node to indicate that said series of one or more segments consists of one segment that is included in said one packet.

10. The method of claim 1, wherein said second data includes a sequence number that indicates for each packet of said plurality of packet s a position in said series for each segment that is included in each packet.

11. The method of claim 1, wherein each packet of said plurality of packets further includes third data that identifies the source node.

12. The method of claim 1, wherein each packet of said plurality of packets further includes third data that specifies an address of the destination node.

13. The method of claim 1, wherein each packet of said plurality of packets further includes third data that specifies a size of each packet.

14. The method of claim 1, further comprising the computer-implemented steps of:
   receiving, at said source node from said destination node, an acknowledgement for each packet that is received by said destination node; and
   when said acknowledgement for a particular packet is not received within a predetermined length of time, sending said particular packet from said source node to said destination node.

15. The method of claim 14, wherein said predetermined length of time is adjusted based on how long after sending each packet said acknowledgement is received.

16. A method for transferring data from a source node to a destination node over a network, the method comprising the computer-implemented steps of:
   receiving, at said destination node from said source node, a plurality of packets, wherein each packet of said plurality of packets includes a segment created by said source node dividing said data into a series of segment;
   determining based on first data included in each packet whether all segments of said series have been received at said destination node; and
   when all segments of said series have been received, ordering said segments based on second data included in each packet to reconstruct said data that was divided into said series of one or more segments.

17. The method of claim 16, further comprising the steps of:

initializing, at said destination node, local state information in response to said destination node receiving a first packet of said plurality of packets, wherein said destination node uses said local state information to track additional packets of said plurality of packets that are received, and wherein said destination node uses said local state information to order said segments; and discarding, at said destination node, said local state information after all packets of said plurality of packets are received.

18. The method of claim 17, wherein said step of discarding said local state information is performed after a predetermined length of time after all packets of said plurality of packets are received.

19. The method of claim 17, further comprising the computer-implemented step of:

receiving a duplicate of a particular packet of said plurality of packets, wherein said particular packet has already been received at said destination node; and discarding said duplicate of said particular packet.

20. A computer-readable medium carrying one or more sequences of instructions for transferring data from a source node to a destination node over a network, wherein execution of the one or more sequences of instructions by one or more processors causes the one or more processors to:

divide said data into a series of one or more segments;

create a plurality of packets, wherein each packet of said plurality of packets includes:

first data that allows said destination node to determine whether all segments of said series have been received at said destination node, and second data that allows said destination node to order said segments to reconstruct said data that was divided into said series of one or more segments; and send said plurality of packets from said source node to said destination node.

21. The computer-readable medium of claim 20, wherein said first data includes third data that indicates whether each packet of said plurality of packets includes a first segment of said series of one or more segments.

22. The computer-readable medium of claim 21, wherein said third data includes a first bit that is set by the source node to indicate that a particular packet includes said first segment of said series of one or more segments.

23. The computer-readable medium of claim 20, wherein said first data includes third data that indicates whether each packet of said plurality of packets includes a last segment of said series of one or more segments.

24. The computer-readable medium of claim 23, wherein said third data includes a second bit that is not set by the source node to indicate that a particular packet includes said last segment of said series of one or more segments.

25. The computer-readable medium of claim 20, wherein said first data that indicates whether each packet of said plurality of packets includes an intermediate segment of said series of one or more segments.

26. The computer-readable medium of claim 25, wherein said third data includes a first bit that is not set by the source node and a second bit that is set by the source node to indicate that a particular packet includes said intermediate segment of said series of one or more segments.

27. The computer-readable medium of claim 20, wherein said first data includes third data that indicates whether said plurality of packets consists of one packet.

28. The computer-readable medium of claim 27, wherein said third data includes a first bit that is set by the source node and a second bit that is not set by the source node to indicate that said series of one or more segments consists of one segment that is included in said one packet.

29. The computer-readable medium of claim 20, wherein said second data includes a sequence number that indicates for each packet of said plurality of packets a position in said series for each segment that is included in each packet.

30. The computer-readable medium of claim 20, wherein each packet of said plurality of packets further includes third data that identifies the source node.

31. The computer-readable medium of claim 20, wherein each packet of said plurality of packets further includes third data that specifies an address of the destination node.

32. The computer-readable medium of claim 20, wherein each packet of said plurality of packets further includes third data that specifies a size of each packet.

33. The computer-readable medium of claim 20, further comprising instructions to:

receive, at said source node from said destination node, an acknowledgement for each packet that is received by said destination node; and when said acknowledgement for a particular packet is not received within a predetermined length of time, send said particular packet from said source node to said destination node.

34. The computer-readable medium of claim 33, wherein said predetermined length of time is adjusted based on how long after sending each packet said acknowledgement is received.

35. A computer-readable medium carrying one or more sequences of instructions for transferring data from a source node to a destination node over a network, wherein execution of the one or more sequences of instructions by one or more processors causes the one or more processors to:

receive, at said destination node from said source node, a plurality of packets, wherein each packet of said plurality of packets includes a segment created by said source node dividing said data into a series of segments;

determine based on first data included in each packet whether all segments of said series have been received at said destination node; and when all segments of said series have been received, order said segments based on second data included in each packet to reconstruct said data that was divided into said series of one or more segments.

36. The computer-readable medium of claim 35, further comprising instructions to:

initialize, at said destination node, local state information in response to said destination node receiving a first packet of said plurality of packets, wherein said destination node uses said local state information to track additional packets of said plurality of packets that are received, and wherein said destination node uses said local state information to order said segments; and discard, at said destination node, said local state information after all packets of said plurality of packets are received.

37. The computer-readable medium of claim 36, wherein said step of discarding said local state information is performed after a predetermined length of time after all packets of said plurality of packets are received.

38. The computer-readable medium of claim 36, further comprising instructions to:

receive a duplicate of a particular packet of said plurality of packets, wherein said particular packet has already been received at said destination node; and discard said duplicate of said particular packet.

* * * * *